(12) United States Patent
Fife

(10) Patent No.: US 8,390,977 B2
(45) Date of Patent: Mar. 5, 2013

(54) SOLAR POWER INVERTERS, INCLUDING SOLAR POWER INVERTERS HAVING SURGE PROTECTIVE DEVICES, AND ASSOCIATED METHODS

(75) Inventor: John M. Fife, Bend, OR (US)

(73) Assignee: Advanced Energy Industries, Inc, Fort Collins, CO (US)

( * ) Notice: Subject to any disclaimer, the term of this patent is extended or adjusted under 35 U.S.C. 154(b) by 343 days.

(21) Appl. No.: 12/759,652

(22) Filed: Apr. 13, 2010

(65) Prior Publication Data

US 2011/0211290 A1  Sep. 1, 2011

Related U.S. Application Data

(60) Provisional application No. 61/308,852, filed on Feb. 26, 2010.

(51) Int. Cl.
*H02H 9/00* (2006.01)
(52) U.S. Cl. ...................................................... 361/118
(58) Field of Classification Search .................. 361/118
See application file for complete search history.

(56) References Cited

U.S. PATENT DOCUMENTS

| | | | | |
|---|---|---|---|---|
| 5,023,746 | A * | 6/1991 | Epstein | 361/56 |
| 6,750,391 | B2 * | 6/2004 | Bower et al. | 136/244 |
| 7,417,841 | B2 | 8/2008 | Hotchkiss et al. | |
| 7,629,708 | B1 | 12/2009 | Meyers et al. | |
| 2010/0014205 | A1 | 1/2010 | Gerlach | |

OTHER PUBLICATIONS

Circuit Components Inc., "Filtering and Surge Suppression Fundamentals," 2008, 33 pages.
Dehn + Söhne, "Lightning Protection Guide," 2004, 242 pages.
The Electronics Club, "Electricity and the Electron," <http://www.kpsec.freeuk.com/electron.htm>, internet accessed on Mar. 17, 2010, 2 pages.
The Electronics Club, "Series and Parallel Connections," <http://www.kpsec.freeuk.com/seriespa.htm>, internet accessed on Mar. 17, 2010, 3 pages.
The Electronics Club, "Variable Resistors," <http://www.kpsec.freeuk.com/components/vres.htm>, internet accessed on Mar. 17, 2010, 3 pages.
Ferraz Shawmut, "Surge-Trap Transient Voltage Surge Supressor," 2007, 6 pages.
Martino, F., "Transient Voltage Surge Protection," <http://www.powerqualityanddrives.com/transient_surge_protection/>, internet accessed on Apr. 14, 2010, copyright 1996, 3 pages.
Wikipedia.org, "Grid tie inverter," <http://en.wikipedia.org/wiki/Grid_tie_inverter>, internet accessed on Mar. 17, 2010, 4 pages.
Wikipedia.org, "Ground and neutral," <http://en.wikipedia.org/wiki/Ground_and_neutral>, internet accessed on Mar. 18, 2010, 4 pages.
Wikipedia.org, "Surge Protector," <http://en.wikipedia.org/wiki/Surge_protector>, internet accessed on Apr. 14, 2010, 5 pages.
Wikipedia.org, "Three-phase electric power," <http://en.wikpedia.org/wiki/Three-phase_electric_power>, internet accessed on Mar. 17, 2010, 8 pages.
Wikipedia.org, "Varistor," <http://en.wikipedia.org/wiki/Varistor>, internet accessed on Apr. 14, 2010, 4 pages.
Wilkins, R., "Protection of TVSS Systems," undated, 8 pages.

* cited by examiner

*Primary Examiner* — Stephen W Jackson
(74) *Attorney, Agent, or Firm* — Perkins Coie LLP

(57) ABSTRACT

In one embodiment, a solar power inverter includes at least one component associated with conversion of direct current (DC) from one or more photovoltaic cells to alternating current (AC). The component is electrically coupleable to an electrical conductor configured to carry electrical current. The solar power inverter also includes a first surge protective device (SPD) electrically coupled to the component and electrically coupleable to the electrical conductor. The solar power inverter also includes a second SPD electrically coupled in parallel with the first SPD and electrically coupleable to the electrical conductor. As described in more detail herein, the first SPD is configured to actuate in response to a voltage surge on the electrical conductor before the second SPD.

9 Claims, 6 Drawing Sheets

SOLAR POWER INVERTERS, INCLUDING SOLAR POWER INVERTERS HAVING SURGE PROTECTIVE DEVICES, AND ASSOCIATED METHODS

CROSS-REFERENCE TO RELATED APPLICATION

This application claims the benefit of U.S. Provisional Patent Application No. 61/308,852, filed Feb. 26, 2010 which is incorporated herein by reference in its entirety.

TECHNICAL FIELD

This application is directed to solar power inverters, and methods associated with solar power inverters.

BACKGROUND

Transient voltage surges can occur on current-carrying lines, such as electricity transmission lines, and other current-carrying electrical conductors. Such transient voltage surges have the potential to damage certain electrical components. Surge protective devices are typically used to protect such electrical components against transient voltage surges.

A solar power inverter typically contains a conventional surge protection system that consists of, for each of one or more current-carrying lines to which the solar power inverter is electrically coupled, a single surge protective device that protect components of the solar power inverter from transient voltage surges that may occur on the current-carrying line. For example, the solar power inverter may contain a single surge protective device for each alternating current line and/or for each direct current line that is electrically coupled to the solar power inverter. The single surge protective device is configured to protect other components of the solar power inverter from transient voltage surges on the line to which it is electrically coupled.

DETAILED DESCRIPTION

A. Overview

Figure 1:
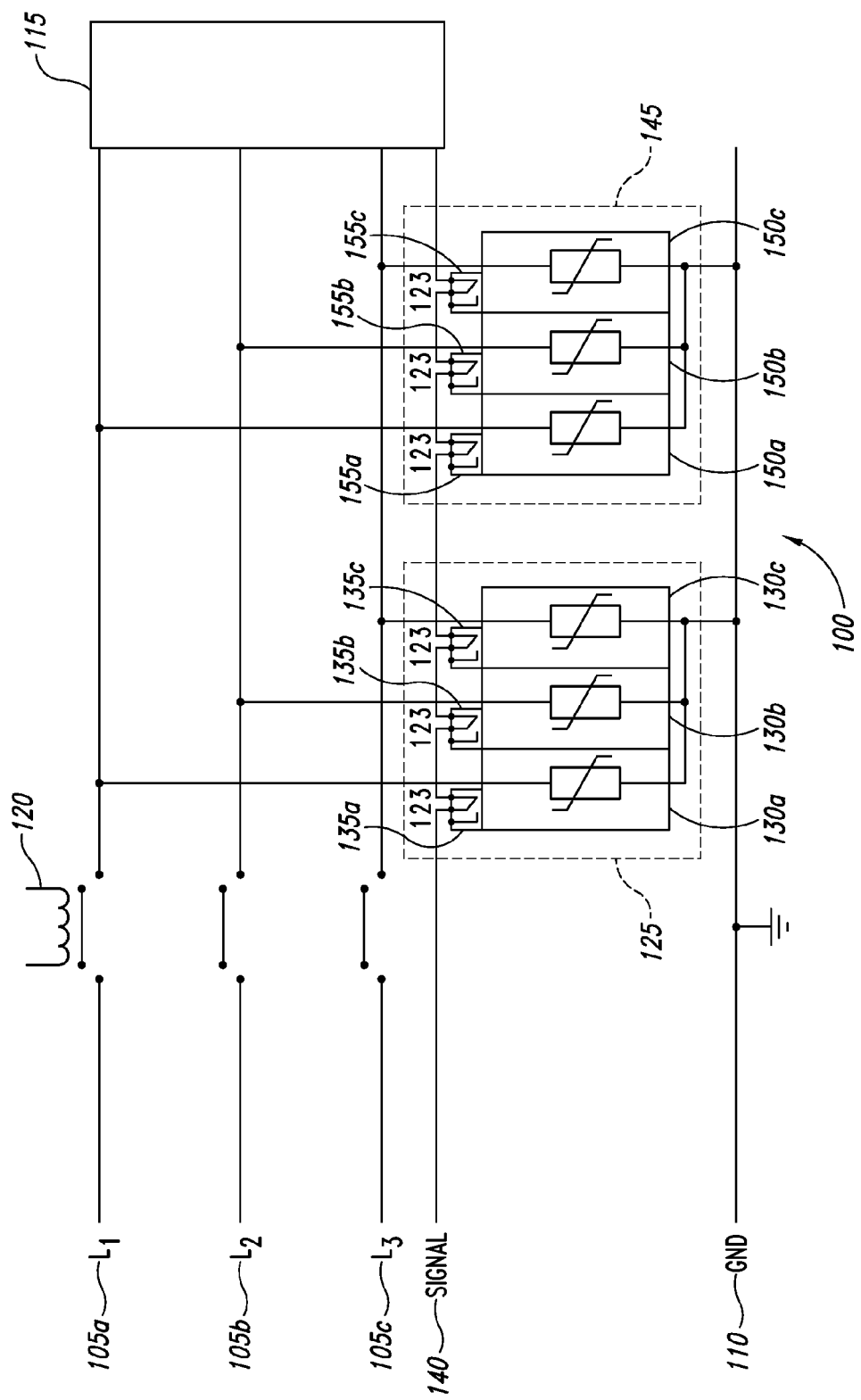
FIG. 1 is a circuit diagram illustrating a portion of a solar power inverter configured in accordance with an embodiment of the technology.

The inventor has recognized that a solar power inverter containing a conventional surge protection system may be susceptible to transient voltage surges that have the potential to damage solar power inverter components. For example, a single surge protective device (SPD) of a conventional surge protection system can fail due to voltage surges on the line to which it is electrically coupled. Such voltage surges may be caused by externalities such as lightning strikes or cycling of motors (e.g., motors in industrial environments). A voltage surge may be alternately referred to as a transient voltage surge, a voltage transient, or a voltage spike. A single voltage surge can be associated with a large amount of power and cause an SPD to fail. Or, an SPD can fail due to numerous voltage surges received over a period of time. As another example, an SPD can fail due to a manufacturing or installation defect. Accordingly, a conventional surge protection system presents the risk that voltage surges may damage solar power inverter components.

The present disclosure describes solar power inverters, including solar power inverters having multiple SPDs that are electrically coupled in parallel to an electrical conductor over which voltage surges can occur. Such parallel-coupled SPDs can reduce the risk of voltage surges damaging solar power inverter components. As an example, a solar power inverter configured in accordance with embodiments of the technology can include two SPDs for each line of a three phase alternating current circuit. The first SPD can be configured to actuate in response to voltage surges before the second SPD actuates. The first SPD actuates by providing a path for current that has a lower impedance than the path along which current flows when the SPD is not actuated. For example, current can normally flow along an alternating current line that is electrically coupled to solar power inverter components. The first SPD can be electrically coupled between the alternating current line and a ground line. The first SPD actuates by providing a current path between the alternating current line and the ground line that has a lower impedance than the current path along the alternating current line. Additionally or alternatively, the first SPD can provide a lower impedance path between the alternating current line and other reference points (e.g., to another alternating current line, to a neutral line, etc.). Together, the dual SPDs can provide redundant protection against voltage surges, thereby providing additional protection (compared with the protection afforded by a single SPD of a conventional surge protection system) for other components of the solar power inverters. In such a solar power inverter, a redundant (secondary) SPD can still protect solar power inverter components even in the case of failure of a main (primary) SPD.

As will be apparent to those of skill in the art, the technology described herein can provide advantages over conventional surge protection systems. One advantage is that the two SPDs can let through lower voltage surges than conventional surge protection systems having a single SPD. Another advantage is that the two SPDs can be configured such that there is a lower probability of failure of both SPDs, thereby providing greater protection to solar power inverter components than the protection afforded by conventional surge protection systems having a single SPD. Other advantages of the technology can be apparent to those of skill in the art.

Certain details are set forth in the following description and in FIGS. 1-5 to provide a thorough understanding of various embodiments of the technology. Other details describing well-known aspects of solar power inverters, however, are not set forth in the following disclosure so as to avoid unnecessarily obscuring the description of the various embodiments.

Many of the details, dimensions, angles and other features shown in the Figures are merely illustrative of particular embodiments. Accordingly, other embodiments can have other details, dimensions, angles and features. In addition, further embodiments can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 100 is first introduced and discussed with reference to FIG. 1.

In one embodiment, a solar power inverter includes at least one component associated with conversion of direct current (DC) from one or more photovoltaic cells to alternating current (AC). The component is electrically coupleable to an electrical conductor configured to carry electrical current. The solar power inverter also includes a first SPD electrically coupled to the component and electrically coupleable to the electrical conductor. The solar power inverter also includes a second SPD electrically coupled in parallel with the first SPD and electrically coupleable to the electrical conductor. As described in more detail herein, the first SPD is configured to actuate in response to a voltage surge on the electrical conductor before the second SPD actuates.

In another embodiment, a solar power inverter includes one or more components associated with conversion of DC from one or more photovoltaic cells to AC. The solar power inverter also includes a first SPD electrically coupled to the one or more components and a second SPD electrically coupled in parallel with the first SPD. The first SPD has a first clamping voltage and the second SPD has a second clamping voltage that is greater than the first clamping voltage. The difference between the first and second clamping voltages is such that the first SPD is actuatable by a voltage surge prior to the second SPD.

In another embodiment, a solar power inverter includes means for performing a function associated with converting DC from one or more photovoltaic cells to AC. The solar power inverter further includes first means for protecting the means for performing from voltage surges and second means for protecting the means for performing from voltage surges. The second means for protecting is electrically coupled in parallel with the first means for protecting. The first means for protecting is configured to actuate in response to a voltage surge before the second means for protecting.

In a further embodiment, a method of manufacturing a solar power inverter includes electrically coupling a first SPD to a solar power inverter component and electrically coupling a second SPD in parallel with the first SPD. The first SPD is configured to actuate in response to a voltage surge prior to the second SPD. In some embodiments, the solar power inverter component is susceptible to damage from voltage exceeding a threshold voltage. In such embodiments, the method further includes determining a surge margin for the component, selecting the first SPD having a first clamping voltage that is less than the threshold voltage minus the surge margin, and selecting the second SPD having a second clamping voltage that is less than the threshold voltage minus the surge margin.

B. Embodiments of Solar Power Inverters and Associated Methods

FIG. 1 is a circuit diagram illustrating a portion of a solar power inverter 100 configured in accordance with a particular embodiment. The solar power inverter 100 is electrically coupled to one or more photovoltaic cells (not illustrated in FIG. 1) that produce direct current (DC). The solar power inverter 100 includes various components 115 that convert or facilitate the conversion of DC into alternating current (AC), such as AC that is usable by a utility grid. The components 115 can include power transistors, such as insulating gate bipolar transistors (IGBTs). The components 115 can also include circuit boards, capacitors, transformers, inductors, electrical connectors, and/or other components that perform and/or enable performance of various functions associated with converting DC into AC. The solar power inverter 100 can include connections to three-phase AC lines 105 (shown individually as lines 105a-c) connected to, for example, a utility grid.

The solar power inverter 100 includes multiple surge protective devices (SPDs). An SPD may be alternatively referred to as a transient voltage surge suppressor (TVSS) device, a surge suppression device (SSD), or the like. In the embodiment illustrated in FIG. 1, there is a first set of SPDs (shown as reference character 125) and a second set of SPDs (shown as reference character 145). The first set includes three individual SPDs 130 (shown individually as SPDs 130a-c), each of which includes at least one metal-oxide varistor (MOV). SPD 130a is electrically coupled to the first AC line 105a and to a ground 110. SPD 130b is electrically coupled to the second AC line 105b and to the ground 110. SPD 130c is electrically coupled to the third AC line 105c and to the ground 110. Each of the SPDs 130 has a first rating that indicates a first clamping voltage (alternately referred to as a let-through voltage) at which the SPD 130 is configured to clamp voltage surges. For example, the first rating can be a Suppressed Voltage Rating (SVR) according to Underwriters Laboratories Inc. (UL) 1449 2nd Edition or a Voltage Protection Rating (VPR) according to UL1449 3rd Edition. In some embodiments, the first rating is approximately 480 volts line-to-line on a 480V AC 3-phase circuit. The clamping voltage of an SPD generally corresponds to the SPD rating. Accordingly, the SPDs 130 can have a first clamping voltage of from approximately 277 volts to approximately 1000 volts line-to-ground for typical surge waveforms or from approximately 480 volts to approximately 2000 volts line-to-line for typical surge waveforms.

The second set 145 also includes three SPDs 150 (shown individually as SPDs 150a-c), each of which includes at least one metal-oxide varistor (MOV). SPD 150a is electrically coupled to the first AC line 105a and to a ground 110 and is electrically coupled in parallel with SPD 130a. SPD 150b is electrically coupled to the second AC line 105b and to the ground 110 and is electrically coupled in parallel with SPD 130b. SPD 150c is electrically coupled to the third AC line 105c and to the ground 110 and is electrically coupled in parallel with SPD 130c. Each of the SPDs 150 has a second rating (e.g., a SVR rating or a VPR rating). In some embodiments, the second rating is approximately 600 volts. Accordingly, the SPDs 150 can have a second clamping voltage of from approximately 347 volts to approximately 1500 volts line-to-ground for typical surge waveforms or from approximately 600 volts to approximately 3000 volts line-to-line for typical surge waveforms.

The solar power inverter 100 can also include a contactor 120 that can be actuated to connect the solar power inverter 100 to a utility grid or disconnect the solar power inverter 100 from the utility grid. Although the first 125 and second 145 sets of SPDs are illustrated as being electrically positioned between the contactor 120 and the components 115, in some embodiments the contactor 120 is electrically positioned between the components 115 and the first 125 and second 145 sets of SPDs.

The SPDs 130 remain non-conductive (or may conduct a small amount of current) during normal operation when voltage between the AC lines 105 and ground 110 is below the first clamping voltage. Each SPD 130 is configured to clamp voltage surges on the respective AC line 105 that experiences a voltage surge having a voltage above the first clamping voltage, in order to prevent such voltage surges from reaching the components 115. The components 115 typically are susceptible to damage from voltage surges above a threshold voltage. If the AC line 105a experiences a line-to-ground voltage surge (due to, for example, a lightning strike, an industrial motor, or another cause), as the voltage surge on the AC line 105a rises, the SPD 130a actuates. The SPD 130a actuates by becoming conductive, and provides a lower impedance current path to ground 110. The SPD 130 thereby shunts the current to ground such that the current does not reach the components 115 in an amount that can damage the components 115. The SPD 130a shunting the current reduces the surge voltage on the AC line 105a. Accordingly, the SPD 130a protects the components 115 from voltage surges on the AC line 105a. SPDs 130b and 130c are similarly configured to clamp voltage surges on the second and third AC lines 105b and 105c, respectively, in order to prevent such voltage surges from damaging the components 115.

While the SPDs 130 remain operational, because the first clamping voltage is lower than the second clamping voltage of the SPDs 150, the SPDs 130 actuate in response to voltage surges on the AC lines 105 prior to actuation of the SPDs 150. The difference between the first and second clamping voltages is such that the SPDs 130 actuate prior to actuation of the SPDs 150. Put another way, there is enough of a difference between the first and second clamping voltages to provide a high degree of certainty that the SPDs 130 will actuate first in response to voltage surges on the AC lines 105. While the SPDs 130 remain operational, voltage surges on a particular AC line 105 are clamped by the corresponding SPD 130, and the associated current is shunted through the corresponding SPD 130. In other words, while the SPDs 130 remain operational, current associated with voltage surges flows through the SPDs 130 to ground, thereby protecting the components 115.

In some embodiments, while the SPDs 130 remain operational, the SPDs 150 actuate in response to voltage surges on the AC lines 105, but do so at a non-negligible time after the SPDs 130 have actuated. For example, an SPD 130 can actuate in response to a voltage surge at a first time, and the corresponding SPD 150 can actuate in response to the voltage surge at a second time that is a non-trivial time after the first time. In such embodiments, the SPD 130 shunts a majority of the current (and thus dissipates the majority of the energy associated with the voltage surge) and the SPD 150 shunts a minority of the current (and thus dissipates a minority of the associated energy). In some embodiments, the SPDs 150 only actuate in response to voltage surges on the AC lines 105 if the SPDs 130 fail to actuate.

Although the SPDs 130/150 are described as clamping line-to-ground voltage surges, the SPDs 130/150 can clamp voltage surges between any two reference points between which the SPDs 130/150 are electrically coupled. For example, in some embodiments, a first SPD 130 and a second SPD 150 can be electrically coupled between a first alternating current line and a second alternating current line. Accordingly, the first 130 and second 150 SPD can clamp line-to-line voltage surges. As another example, in other embodiments, a first SPD 130 and a second SPD 150 can be electrically coupled between a first alternating current line and a neutral line. Accordingly, the first 130 and second 150 SPD can clamp line-to-neutral voltage surges. Those of skill in the art will understand that various configurations for the first 130 and second 150 SPDs are possible and that the technology is not necessarily limited to the embodiments described herein.

Any of the SPDs 130 can fail, due to either a single voltage surge or to the cumulative effects of multiple voltage surges on the associated AC line 105. For example, an SPD 130 can fail after having dissipated a certain amount of energy associated with one or more voltage surges. Additionally or alternatively, an SPD 130 can fail as a result of other causes (e.g., manufacturing defects, installation defects, etc.). In the event of failure of one or more of the SPDs 130, the corresponding SPDs 150 still function to clamp voltage surges, thereby protecting the components 115 until the failed SPD 130 can be replaced. In such event, because the second clamping voltage of the SPDs 150 is greater than the first clamping voltage of the SPDs 130, the SPD 150 can let through voltage surges that would otherwise be clamped by the SPD 130. However, such voltage surges typically do not damage the components 115. In other words, the difference between the first and second clamping voltages is great enough that the first SPD 130 actuates in response to a voltage surge before the second SPD 150, but the difference is not so great that in the event the first SPD 130 fails, the second SPD 150 does not actuate in response to voltage surges that can damage the components 115.

Each of the SPDs 130 can include a device 135 (shown individually as devices 135a-c) that can detect failure of the corresponding SPD 130 and provide an indication of the failure. Each of the SPDs 150 can include a similar device 155 that can detect failure of the corresponding SPD 150 and provide an indication of the failure. In some embodiments, the devices 135/155 are electrically isolated from the corresponding SPDs 130/150. The devices 135/155 can be electrically coupled together (daisy-chained) so as to provide a normally closed circuit on signal line 140, and can be electrically coupled to a detection component that detects the opening of the normally closed circuit. In some embodiments, each of the devices 135/155 can be wired normally open (or normally closed) and electrically coupled to an individual detection component that detects closing (or opening) of the circuit. Although not illustrated as such in FIG. 1, both ends of the signal line 140 can be electrically coupled to the components 115.

The devices 135/155 can use various techniques to detect failures of the SPDs 130/150. For example, the device 135 can include suitable material (e.g., solder) that retains a biasing mechanism (e.g., a spring), thereby causing a switch at dry contact 3 to be electrically coupled to dry contact 2. If the SPD 130 experiences a voltage surge, the temperature of the SPD 130 (e.g., the temperature of the MOV of the SPD) can rise. The temperature rise can cause the retaining material in the device 135 to melt. The melting of the retaining material can release the biasing mechanism, thereby causing the switch at dry contact 3 to move from contacting dry contact 2 to contacting dry contact 1 and opening the circuit on signal line 140. The detection component detects that the circuit has opened and thus that one of the SPDs 130/150 has failed. The detection component can store an indication of the failure of one of the SPDs 130/150 in a register of a controller (e.g., a microprocessor) of the solar power inverter 100, and the register can be read via an interface (e.g., a serial interface). Additionally or alternatively, the indication of the failure can be provided to a Supervisory Control And Data Acquisition (SCADA) component which can alert an appropriate person (e.g., technician, operator, etc.) to replace the failed SPD 130/150.

Figure 6A:
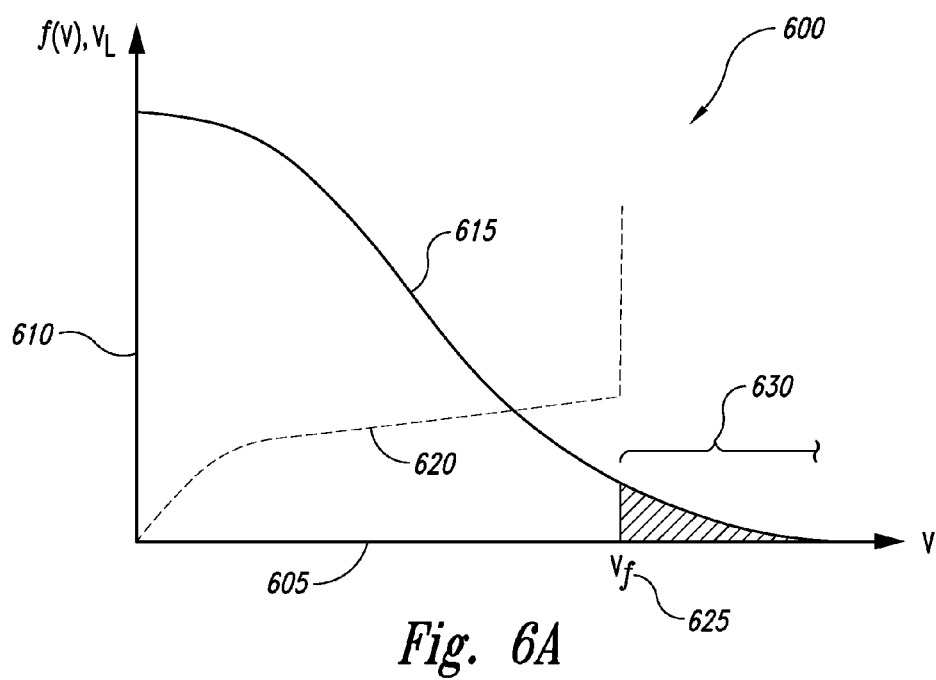
FIG. 6A is a diagram illustrating a graph of a model probability distribution curve for transient voltage surges on a particular line to which a conventional solar power inverter having single surge protective device is electrically coupled.

The solar power inverter 100 can provide several advantages over solar power inverters equipped with a conventional voltage surge protection system (i.e., one without parallel SPDs having different clamping voltages). FIG. 6A is a diagram illustrating a graph 600 of a model probability distribution curve 615 for voltage surges expected to occur (over a particular time frame) on an electrical line to which a conventional solar power inverter having a single SPD is electrically coupled. The x-axis 605 is voltage V of a voltage surge. The y-axis 610 includes both a primary y-axis that is the probability f(V) of a voltage surge occurring with a particular surge voltage V and a secondary y-axis that is a let-through voltage $V_L$ of the single SPD given a particular surge voltage V. As curve 615 indicates, higher-voltage voltage surges are less likely to occur than lower-voltage voltage surges. The graph 600 also includes a dashed line 620 indicating the let-through voltage $V_L$ of the single SPD that varies in accordance with the surge voltage V. The single SPD can be expected to have a failure voltage $V_f$ 625 at which the single SPD fails, and a let-through voltage $V_L$ 620 accordingly spikes at the failure voltage $V_f$ 625.

The conventional voltage surge protection system can be configured to clamp, as an example, 90% of the voltage surges expected over a particular time frame (e.g., one year, ten years, 20 years, etc.). In the graph 600, 90% is the value given by the integral of the curve 615 between the origin and $V_f$ 625 divided by the value given by integral of the curve 615 between the origin and an infinite voltage. A voltage surge having a voltage greater than $V_f$ 625 (i.e., in the 10% distribution, as indicated by reference number 630) would typically cause the conventional voltage surge protection system to fail (i.e., the single SPD would fail), thereby leaving the solar power inverter components completely unprotected. Moreover, such failure may not be detectable, or may be difficult to detect.

As those of skill in the art understand, varying the clamping voltage of the single SPD affects the let-through voltage 620 and the failure voltage $V_f$ 625. For example, increasing the clamping voltage increases both the let-through voltage 620 and the failure voltage $V_f$ 625. This means that the single SPD will be less susceptible to failure but will let through higher voltage surges, thereby increasing the risk of damage to solar power inverter components. Conversely, decreasing the clamping voltage decreases both the let-through voltage 620 and the failure voltage $V_f$ 625. This means that the single SPD will let through lower voltage surges, thereby decreasing the risk of damage to solar power inverter components, but will be more susceptible to failure. Accordingly, a solar power inverter having a single SPD makes a trade-off between protecting sensitive electrical components and SPD life expectancy.

In contrast, the solar power inverter 100 can eliminate or at least reduce the need to make such a trade-off. The first SPD 130 can be configured with the same or lower clamping voltage as the clamping voltage of a single SPD, thereby letting through generally the same or lower voltage surges as a single SPD. The second SPD 150 can be configured with a higher clamping voltage such that it actuates after the first SPD 130. In the event of failure of the first SPD 130, the second SPD 150 functions as a redundant backup that still clamps most or all voltage surges that have the potential to damage solar power inverter components 115. Such a dual SPD configuration can thus have a greater life expectancy than a single SPD configuration.

Figure 6B:
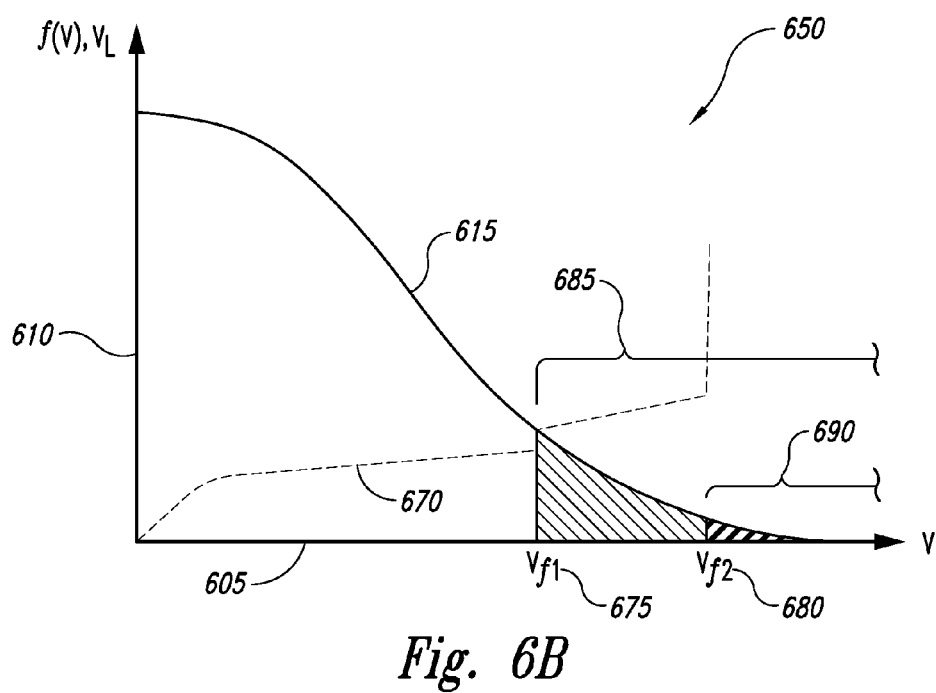
FIG. 6B is a diagram illustrating a graph of a model probability distribution curve for transient voltage surges on a particular line to which a solar power inverter configured in accordance with embodiments of the technology is electrically coupled.

For example, the SPDs 130 can also be configured to clamp a certain percentage (e.g., 85%) of the voltage surges in a voltage surge distribution expected over a particular time frame (e.g., one year, ten years, 20 years, etc.). FIG. 6B is a diagram illustrating a graph 650 of the model probability distribution curve 615 for voltage surges expected to occur (over a particular time frame) on an electrical line to which an SPD 130 and an SPD 150 is electrically coupled. The x-axis 605 and the y-axis 610 of FIG. 6B are the same as for FIG. 6A. The graph 650 also includes a dashed line 670 indicating a let-through voltage $V_L$ of the SPDs 130 and 150 that varies in accordance with the surge voltage V. As can be seen by comparing FIGS. 6A and 6B, the let-through voltage 670 can be less than the let-through voltage 620 for equivalent voltage surges. One advantage of the technology is that for certain voltage surges, the SPDs 130 and 150 can let through lower voltage than a single SPD.

In the event that a voltage surge in the 15% distribution (as indicated by reference number 685) is received over a particular line 105 and the electrically coupled SPD 130 fails (at failure voltage $V_{f1}$ 675), the components 115 are not left completely unprotected. Rather, the SPD 150 that is also electrically coupled to that particular line 105 still functions to provide protection for the components 115. The SPD 150 can be configured such that it clamps a certain percentage (e.g., 99%) of the voltage surges in a voltage surge distribution expected over a particular time frame. Only voltage surges in the 1% distribution (as indicated by reference number 690) would cause the SPD 150 to fail (at failure voltage $V_{f2}$ 680). Accordingly, another advantage of the technology is that there can be a lower probability of total failure of both the SPD 130 and the SPD 150, thereby providing greater protection to the components 115 of the solar power inverter 100.

Moreover, the corresponding detection device 135 can provide an indication of the failure of the SPD 130. The detection component can detect an open circuit on the signal line 140, thus indicating that one of the SPDs 130/150 has failed, although not necessarily which SPD 130/150. However, because the SPDs 130 are configured to actuate prior to the SPDs 150 and thus are more likely to fail first, an open circuit on the signal line 140 likely indicates that it is one of the SPDs 130 that has failed. Such failure can be confirmed by detecting a closed circuit between dry contacts 1 and 2 of the SPDs 130 or by visual inspection. Because failures are likely to be of the SPDs 130, replacement SPDs can be stocked and prepared ahead of time.

As another example of a shortcoming of conventional surge protection systems, for a configuration involving two SPDs having identical clamping voltages that are electrically coupled in parallel with the components 115 on a particular line, it may not be predictable which SPD would actuate first in response to a voltage surge on the particular line. In such a configuration, both SPDs could actuate at the same time or at nearly the same time in response to a voltage surge on the particular line, and both SPDs could dissipate generally the same amounts of the energy associated with the voltage surge. In such a configuration, both SPDs would be prone to failure generally at the same time, thereby leaving the components 115 completely unprotected and vulnerable to voltage surges.

In contrast, as previously noted, one advantage of the technology is that there is enough of a difference between the first clamping voltage of the first SPDs 130 and the second clamping voltages of the second SPDs 150 to provide a high degree of certainty that the SPDs 130 will actuate first in response to a voltage surge. Therefore, the SPDs 130 are more likely to dissipate the majority of the energy associated with one or more voltage surges, and thus the SPDs 130 are more likely to fail before the SPDs 150. Such a degree of certainty allows an operator of the solar power inverter 100 to prepare appropriately.

Figure 2:
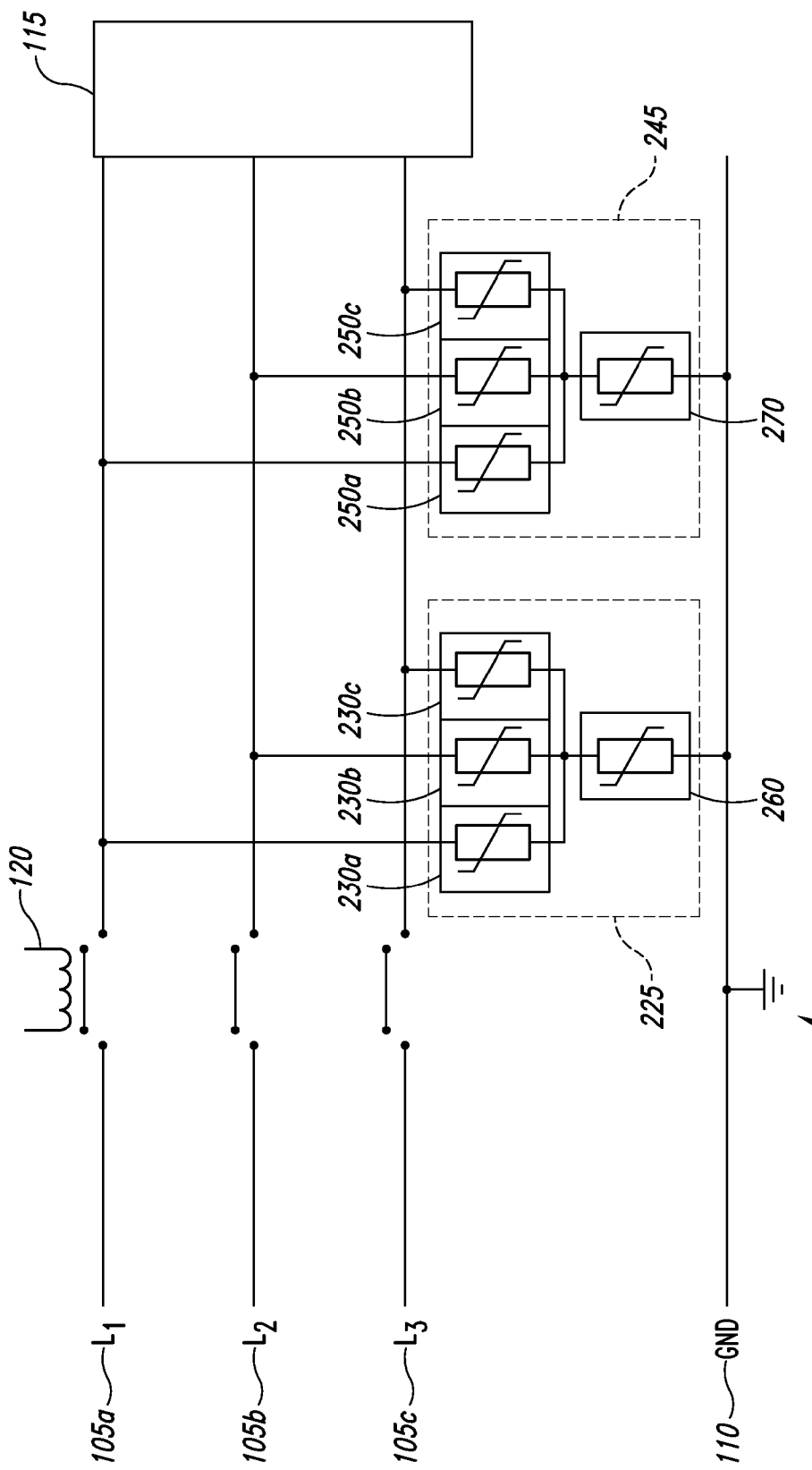
FIG. 2 is a circuit diagram illustrating a portion of a solar power inverter configured in accordance with another embodiment of the technology.

FIG. 2 is a circuit diagram illustrating a portion of a solar power inverter 200 configured in accordance with another embodiment of the technology. The solar power inverter 200 includes a first set 225 of SPDs and a second set 245 of SPDs. The first set 225 includes three SPDs 230 (shown individually as SPDs 230a-c), each of which is electrically coupled to the corresponding AC line 105. The three SPDs 230 are electrically coupled to a fourth SPD 260 which is also electrically coupled to the ground line 110. Each of the SPDs 230 and 260 can have a first voltage rating that is generally the same. The second set 245 includes three SPDs 250 (shown individually as SPDs 250a-c), each of which is electrically coupled to the corresponding AC line 105. The three SPDs 250 are electrically coupled to a fourth SPD 270 which is also electrically coupled to the ground line 110. Each of the SPDs 250 and 270 can have a second voltage rating that is generally the same and that is greater than the first voltage rating. Although not illustrated, each of the SPDs in FIG. 2 can include a device that detects failure of the corresponding SPD, similar to the devices 135/155 illustrated in FIG. 1.

The operation of the two sets 225/245 of SPDs is generally similar to that of the two sets of SPDs 125/145 of FIG. 1. That is, when a line 105 experiences a voltage surge, the SPDs 230/260, because the first voltage rating (and thus a first clamping voltage of the SPDs 230/260) is lower than the second voltage rating of the SPDs 250/270 (and thus a second clamping voltage of the SPDs 250/270), actuate first, thereby shunting current to ground. In the event of failure of one or more of the SPDs 230, the corresponding SPDs 250 still function to clamp voltage surges, thereby protecting the components 115 until the failed SPDs 230 can be replaced.

Figure 3:
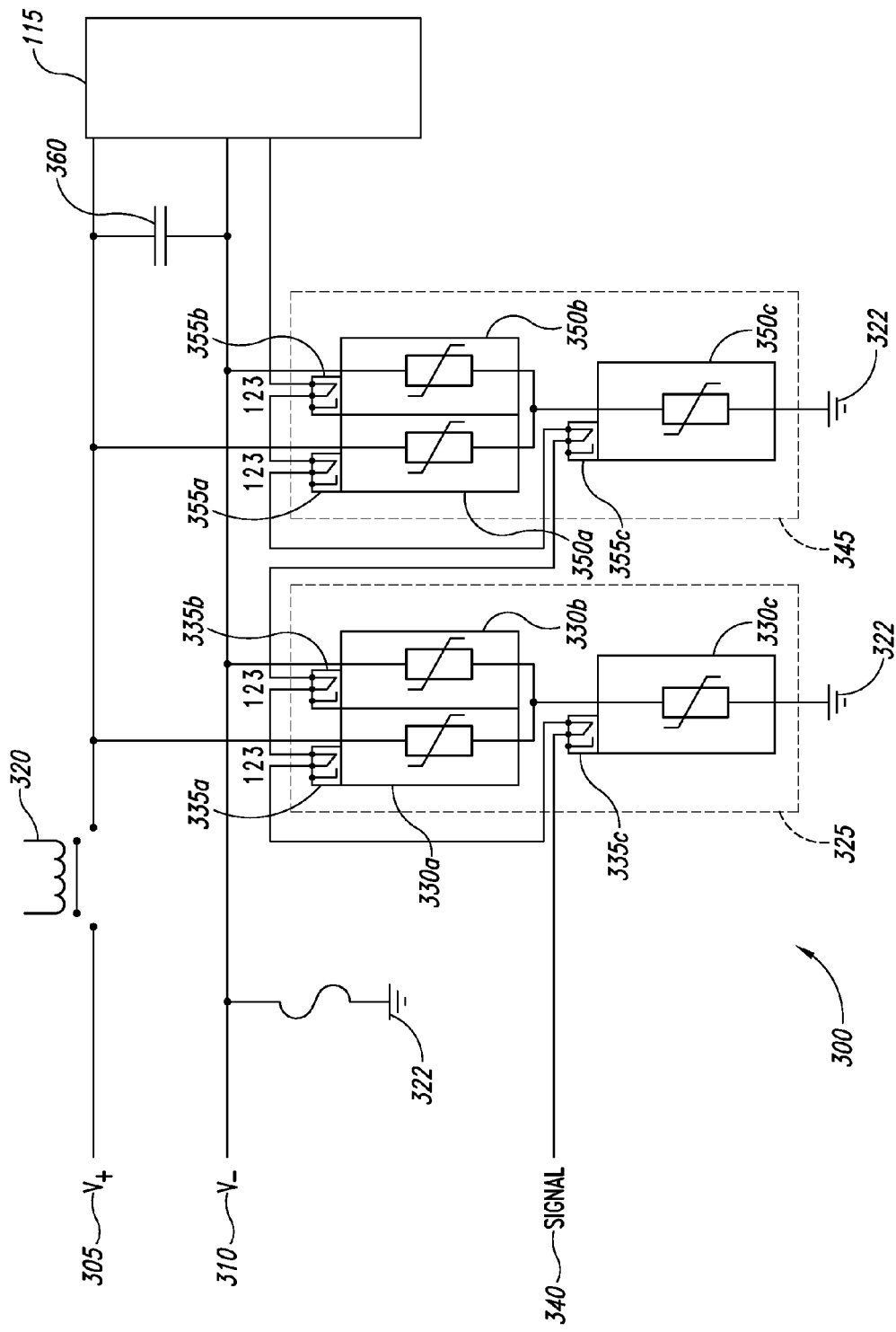
FIG. 3 is a circuit diagram illustrating a portion of a solar power inverter configured in accordance with another embodiment of the technology.

FIG. 3 is a circuit diagram illustrating a portion of a solar power inverter 300 configured in accordance with another embodiment of the technology. In FIG. 3, the components 115 are electrically coupled to a positive voltage DC line 305 and a negative voltage DC line 310. The solar power inverter 300 can also include a contactor 320 and a capacitor 360.

The solar power inverter 300 includes a first set 325 of SPDs 330 (shown individually as SPDs 330a-c). The SPDs 330 are Y-configured. SPD 330a is electrically coupled to the line 305 so as to respond to voltage surges on the line 305. SPD 330b is electrically coupled to the line 310 so as to respond to voltage surges on the line 310. Both SPDs 330a and 330b are electrically coupled to SPD 330c, which is electrically coupled to ground 322.

The solar power inverter 300 also includes a second set 345 of SPDs 350 (shown individually as SPDs 350a-c). The SPDs 350 are also Y-configured. SPD 350a is also electrically coupled to the line 305 and thus is electrically coupled in parallel with SPD 330a. SPD 350b is electrically coupled to the line 310 and thus is electrically coupled in parallel with SPD 330b. Both SPDs 350a and 350b are electrically coupled to SPD 350c, which is electrically coupled to ground 322. Each of the SPDs 330/350 can also include a device 335/355 that functions generally similarly to the devices 135/155 of FIG. 1 (detecting failure of a corresponding SPD 330/335 and opening the circuit on the signal line 140).

The SPDs 330 have a first voltage rating and a first clamping voltage that generally corresponds to the first rating. The SPDs 350 have a second voltage rating that is greater than the first voltage rating and a second clamping voltage that generally corresponds to the second rating. The difference between the second clamping voltage and the first clamping voltage is such that the SPD 330 is actuatable by a voltage surge (on the corresponding line 305/310) prior to the SPD 350. The operation of the two sets 325/345 of SPDs can be generally similar to that of the two sets of SPDs 125/145 of FIG. 1.

Figure 4A:
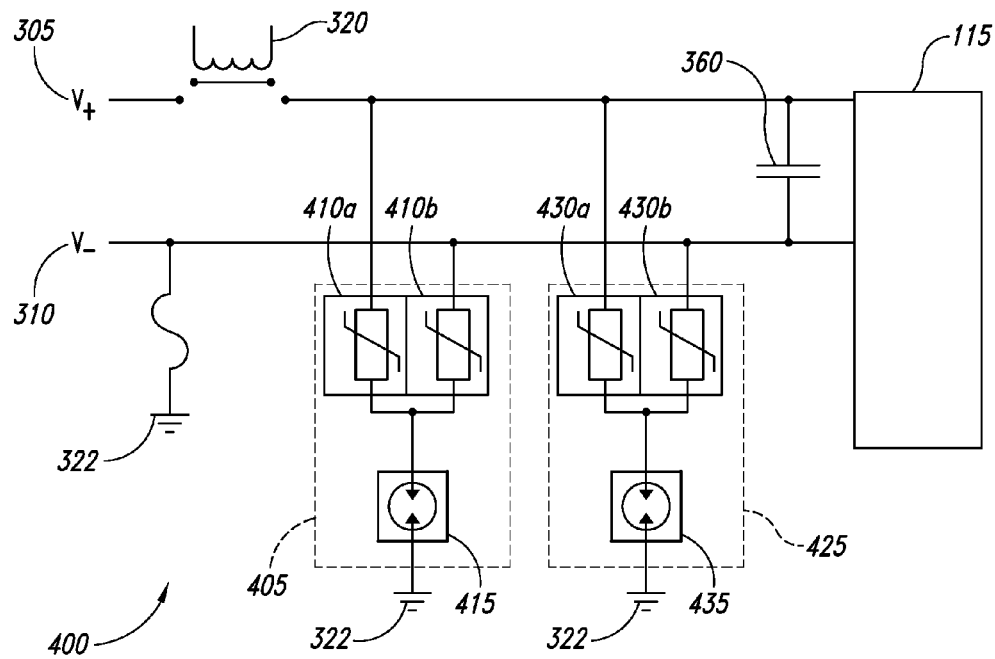
FIGS. 4A and 4B are circuit diagrams illustrating portions of solar power inverters configured in accordance with embodiments of the technology.
Figure 4B:
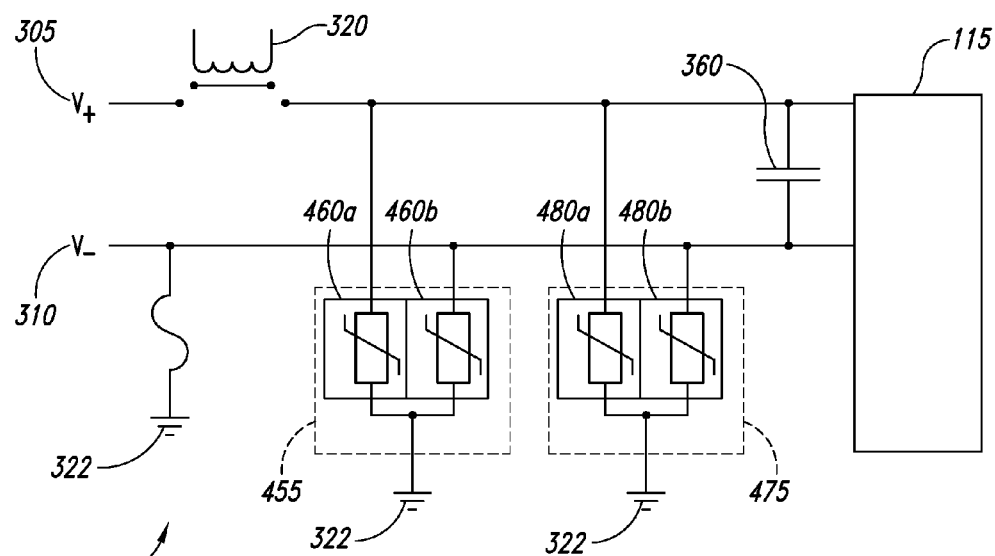

FIGS. 4A and 4B are circuit diagrams illustrating portions of solar power inverters 400 and 450 configured in accordance with other embodiments of the technology. FIG. 4A includes a first set of SPDs 405 and a second set of SPDs 425. The first 405 and second 425 sets of SPDs are Y-configured, generally similar to the Y-configuration of the first 325 and second 345 sets of SPDs in FIG. 3. However, the SPDs 415 and 435 include a gas tube instead of an MOV. The SPDs 410 have a first voltage rating that is greater than a second voltage rating of the SPDs 430. Accordingly, the SPDs 410 actuate in response to voltage surges on the lines 305/310 before the SPDs 430.

In FIG. 4B, each of the first 455 and second 475 sets of SPDs includes only two individual SPDs 460 (shown individually as SPDs 460a and 460b) and 480 (shown individually as SPDs 480a and 480b), respectively. The SPDs 460 have a first voltage rating that is greater than a second voltage rating of the SPDs 480. Accordingly, the SPDs 460 actuate in response to voltage surges on the lines 305/310 before the SPDs 480.

Figure 5:
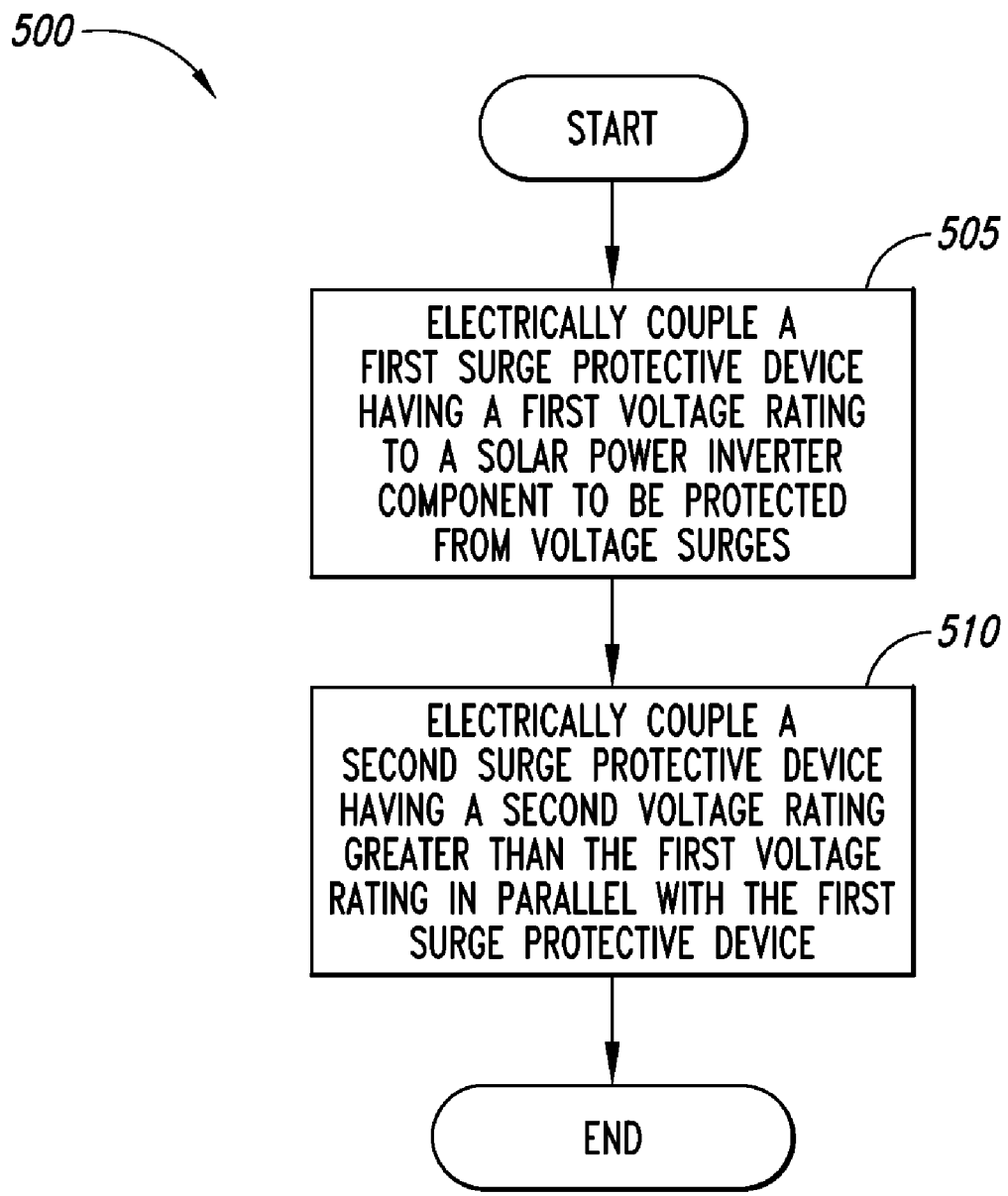
FIG. 5 is a flow diagram of a process for manufacturing solar power inverters configured in accordance with embodiments of the technology.

FIG. 5 is a flow diagram of a process 500 for manufacturing solar power inverters configured in accordance with embodiments of the technology. The process begins at step 505, where a first SPD having a first clamping voltage is electrically coupled to one or more solar power inverter components to be protected from voltage surges (e.g., voltage surges on one or more DC or AC lines to which the one or more components are electrically coupleable). At step 510, a second SPD having a second clamping voltage greater than the first voltage rating is electrically coupled in parallel with the first SPD. The difference between the first and second clamping voltages is such that the first SPD actuates in response to a voltage surge prior to the second SPD. The process 500 then concludes. Although the process 500 is described as selecting SPDs based upon their clamping voltages (let-through voltages), the SPDs may be selected based upon other properties (e.g., their voltage ratings).

In some embodiments, a selection of the first and second SPDs is made based at least partly upon a previously-made determination of a surge margin for the one or more solar power inverter components. For example, voltage surges may be applied to solar power inverter components that are not protected by SPDs to determine a threshold voltage $V_T$ at which the solar power inverter components fail. Then, similar solar power inverter components are protected by SPDs, and similar voltage surges are applied to determine a peak voltage let through by the SPDs. Surge margin $V_{SM}$ refers to the difference between the threshold voltage and the peak voltage let through by the SPDs. Typically, there should be an acceptable amount of surge margin for both the first and the second SPDs. That is, the first SPD should be selected to have a first clamping voltage $V_1$ such that the first SPD provides an acceptable amount of surge margin. For example, the first SPD can be selected according to equation (1):

$$V_1 < V_T - V_{SM} \tag{1}$$

The second SPD should also be selected to have a second clamping voltage $V_2$ such that the second SPD also provides an acceptable amount of surge margin, while still maintaining enough of a difference between the first and second clamping voltages that the first SPD actuates before the second SPD in response to a voltage surge. For example, the second SPD can be selected according to equation (2):

$$V_1 < V_2 < V_T - V_{SM} \tag{2}$$

In some embodiments, there is at least approximately 1 kilovolt of surge margin provided by both the first and the second SPDs.

Those skilled in the art will appreciate that the steps shown in FIG. 5 may be altered in a variety of ways. For example, the order of the steps may be rearranged; substeps may be performed in parallel; shown steps may be omitted, or other steps may be included; etc.

As will be apparent to those of skill in the art, the technology described herein can be applicable to protect systems other than solar power inverters. The technology can be applied to protect systems that have a connection to a current-carrying external conductor. For example, other types of renewable energy systems (e.g., systems associated with the generation of electricity from wind and/or other renewable energy sources) can utilize the technology described herein to protect electrical components from voltage surges. As another example, systems that include one or more electrical components that may be susceptible to voltage surges can benefit from the use of two or more SPDs that are electrically coupled in parallel and that have different clamping voltages so that one SPD actuates before the other SPD.

Such a system can include an electrical component (e.g., electronic circuits, processors, circuit boards, capacitors, transformers, inductors, electrical connectors, etc.) electrically coupleable to an electrical conductor configured to carry electrical current (e.g., DC or AC). A surge protection system configured in accordance with the technology described herein can be used to protect the system. The surge protection system can include a first SPD electrically coupleable to the electrical component and a second SPD electrically coupled in parallel with the first SPD and electrically coupleable to the electrical component. The first SPD is configured to actuate in response to a voltage surge on the electrical conductor before the second SPD actuates.

In some embodiments, the first SPD has a first clamping voltage and the second SPD has a second clamping voltage that is greater than the first clamping voltage. The difference between the first clamping voltage and the second clamping voltage is such that the first SPD responds to a voltage surge before the second SPD. In some embodiments, the electrical component is susceptible to damage by voltage at or above a threshold voltage. The first and second SPDs are selected such that the threshold voltage exceeds the first and second clamping voltages by at least a predetermined margin. In some embodiments, the electrical component is associated with the generation of electricity from a renewable energy source (e.g., solar energy, wind energy, hydro energy, etc.).

From the foregoing, it will be appreciated that specific embodiments of the invention have been described herein for purposes of illustration, but that various modifications may be made without deviating from the spirit and scope of the invention. For example, SPDs including MOVs and gas tubes have been described herein, but SPDs can include other components, such as diodes (silicon diodes, avalanche diodes, etc.), clamping semiconductors, and other suitable components. For example, a first SPD including an MOV and having a first clamping voltage may be electrically coupled in parallel with a second SPD including a diode (e.g., a silicon diode) and having a second clamping voltage that is greater than the first clamping voltage. In response to a voltage surge, the second SPD can clip any overshoot and as the voltage drops to the first clamping voltage, the first SPD can clamp at the first clamping voltage. The first SPD can therefore dissipate the bulk of the energy associated with the voltage surge. As another example, a first SPD including a diode (e.g., a silicon diode) and having a first clamping voltage may be electrically coupled in parallel with a second SPD including an MOV and having a second clamping voltage that is greater than the first clamping voltage. The first SPD could be configured to provide lower let-through voltage but could be more susceptible to failure. However, the second SPD could be configured to clamp voltage surges upon failure of the first SPD. As another example, the elements of one embodiment can be combined with other embodiments in addition to or in lieu of the elements of other embodiments. Accordingly, the invention is not limited except as by the appended claims.

I claim:

1. A solar power inverter comprising:
    at least one component associated with conversion of direct current (DC) from one or more photovoltaic cells to alternating current (AC), the component electrically coupleable to an electrical conductor configured to carry AC electrical current;
    a first surge protective device (SPD) electrically coupled to the component and electrically coupleable to the electrical conductor; and
    a second SPD electrically coupled in parallel with the first SPD and electrically coupleable to the electrical conductor;
    a third SPD electrically coupled to the component and electrically coupleable to a second electrical conductor configured to carry AC;
    a fourth SPD electrically coupled in parallel with the third SPD and electrically coupleable to the second electrical conductor;
    a fifth SPD electrically coupled to the component and electrically coupleable to a third electrical conductor configured to carry AC; and
    a sixth SPD electrically coupled in parallel with the third SPD and electrically coupleable to the third electrical conductor,
    wherein the first SPD is configured to actuate in response to a voltage surge on the electrical conductor before the second SPD,
        the third SPD is configured to actuate in response to a voltage surge the second electrical conductor before the fourth SPD, and
        the fifth SPD is configured to actuate in response to a voltage surge on the third electrical conductor before the sixth SPD.

2. The solar power inverter of claim 1 wherein the first SPD is configured to actuate in response to a voltage surge above a first voltage and the second SPD is configured to actuate in response to a voltage surge above a second voltage that is greater than the first voltage.

3. The solar power inverter of claim 1, further comprising:
    a seventh SPD electrically coupled to the first, third, and fifth SPDs and electrically coupleable to ground; and
    an eighth SPD electrically coupled to the second, fourth, and sixth SPDs and electrically coupleable to ground.

4. A solar power inverter comprising:
    at least one component associated with conversion of direct current (DC) from one or more photovoltaic cells to alternating current (AC), the component electrically coupleable to a first electrical conductor configured to carry DC electrical current;
    a first surge protective device (SPD) electrically coupled to the component and electrically coupleable to the electrical conductor; and
    a second SPD electrically coupled in parallel with the first SPD and electrically coupleable to the electrical conductor;
    wherein the first SPD is configured to actuate in response to a voltage surge on the electrical conductor before the second SPD
    and wherein the solar power inverter further comprises:
    a third SPD electrically coupled to the component and electrically coupleable to a second electrical conductor configured to carry DC; and
    a fourth SPD electrically coupled in parallel with the third SPD and electrically coupleable to the second electrical conductor,
    wherein the third SPD is configured to actuate in response to a voltage surge on the second electrical conductor prior to the fourth SPD.

5. The solar power inverter of claim 4, further comprising:
    a fifth SPD electrically coupled to the first and third SPDs and electrically coupleable to ground; and
    a sixth SPD electrically coupled to the second and fourth SPDs and electrically coupleable to ground.

6. The solar power inverter of claim 5 wherein the fifth SPD includes a gas tube and the sixth SPD includes a gas tube.

7. The solar power inverter of claim 1 wherein the first SPD includes a metal-oxide varistor and the second SPD includes a metal-oxide varistor.

8. The solar power inverter of claim 1 wherein at least one of the first and second SPDs includes a diode.

9. The solar power inverter of claim 1, further comprising:
    a first device configured to detect a failure of the first SPD and provide an indication of the failure to a detection component of the solar power inverter; and
    a second device configured to detect a failure of the second SPD and provide an indication of the failure to the detection component.

* * * * *

UNITED STATES PATENT AND TRADEMARK OFFICE
CERTIFICATE OF CORRECTION

PATENT NO. : 8,390,977 B2
APPLICATION NO. : 12/759652
DATED : March 5, 2013
INVENTOR(S) : John M. Fife Page 1 of 1

It is certified that error appears in the above-identified patent and that said Letters Patent is hereby corrected as shown below:

On Title Page, Item (56), under "Other Publication", column 2, line 10, delete "Supressor," and insert -- Suppressor, --, therefor.

In the Claims:

In column 12, line 5, in claim 1, after "surge" insert -- on --.

Signed and Sealed this
Second Day of July, 2013

Teresa Stanek Rea
*Acting Director of the United States Patent and Trademark Office*